US011906953B2

(12) United States Patent
Fleck et al.

(10) Patent No.: US 11,906,953 B2
(45) Date of Patent: Feb. 20, 2024

(54) METHOD FOR OPERATING A TECHNICAL SYSTEM THAT MOVES IN AN ENVIRONMENT, WITH ASSIGNMENT OF STEERING QUALITY LEVELS

(71) Applicant: obsurver UG (haftungsbeschränkt), Sindelfingen (DE)

(72) Inventors: Sven Fleck, Sindelfingen (DE); Benjamin May, Luebs (DE)

(73) Assignee: obsurver UG(haftungsbeschränkt), Sindelfingen (DE)

(*) Notice: Subject to any disclaimer, the term of this patent is extended or adjusted under 35 U.S.C. 154(b) by 257 days.

(21) Appl. No.: 17/444,700

(22) Filed: Aug. 9, 2021

(65) Prior Publication Data
US 2022/0050445 A1 Feb. 17, 2022

(30) Foreign Application Priority Data
Aug. 12, 2020 (DE) ...................... 10 2020 210 261.9

(51) Int. Cl.
*G05B 19/423* (2006.01)
*B62D 6/00* (2006.01)

(52) U.S. Cl.
CPC ............ *G05B 19/423* (2013.01); *B62D 6/00* (2013.01); *G05B 2219/39573* (2013.01)

(58) Field of Classification Search
None
See application file for complete search history.

(56) References Cited

U.S. PATENT DOCUMENTS
2017/0369074 A1* 12/2017 Mathes ................. B60W 40/04

FOREIGN PATENT DOCUMENTS
DE 10 2015 204 284 A1 9/2016
DE 10 2016 217 893 A1 3/2018
DE 10 2018 201 273 A1 8/2019
(Continued)

OTHER PUBLICATIONS
Mars, Franck, Mathieu Deroo, and Jean-Michel Hoc. "Analysis of human-machine cooperation when driving with different degrees of haptic shared control." IEEE transactions on haptics 7.3 (2014): 324-333. (Year: 2014).*
(Continued)

*Primary Examiner* — Carlos R Ortiz Rodriguez
(74) *Attorney, Agent, or Firm* — Orbit IP

(57) ABSTRACT

A method for operating a technical system in an environment is disclosed, wherein the technical system can be moved, as a whole or in parts, in the environment by a motor. A person controls movements of the technical system in the environment at least temporarily. The technical system has a steering assistance system which a) observes the environment using sensors and, depending on the observed environment, determines reference movement courses for the technical system for future time intervals, b) registers movement courses of the technical system actually controlled by the person in the time intervals, c) carries out a comparison between the reference movement courses and the movement courses actually controlled, and d) depending on the comparison result, assigns one of a plurality of steering quality levels to the person. This allows greater safety in the operation of technical systems which are controlled by people in the environment.

24 Claims, 11 Drawing Sheets

(56) References Cited

FOREIGN PATENT DOCUMENTS

DE  10 2019 110 924 A1  11/2019
DE  10 2019 004 265 A1  5/2020

OTHER PUBLICATIONS

"Telematik-Versicherung: Geld sparen möglich, aber es gibt Kehrseiten" ("Telematics insurance: Saving money is possible, but there are downsides"); downloaded on Aug. 5, 2020 at https://www.verbraucherzentrale.de/wissen/geld-versicherungen/weitere-versicherungen/telematikversicherung-geld-sparen-moeglich-aber-es-gibt-kehrseiten-38399.

* cited by examiner

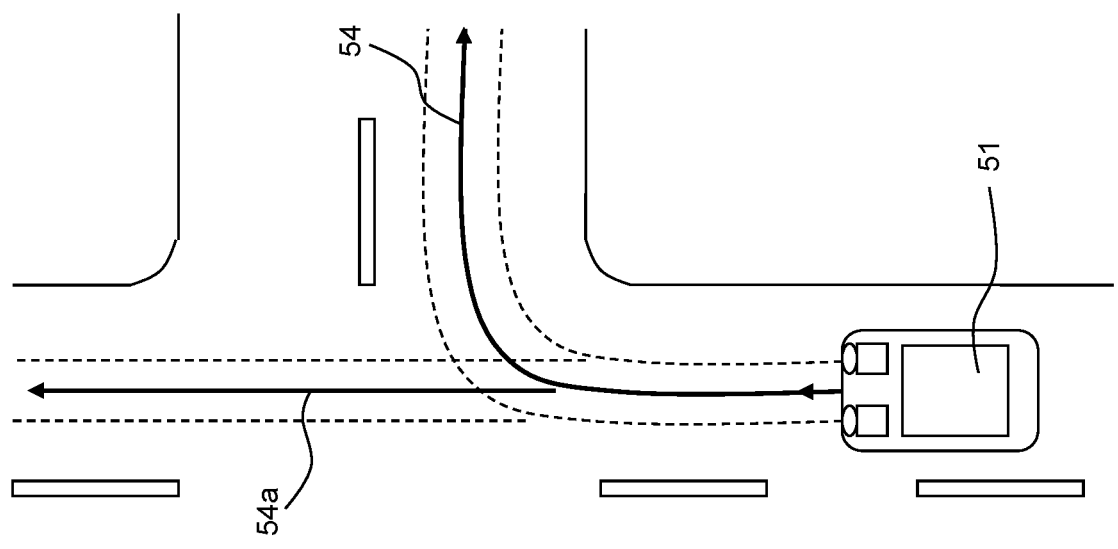

| Steering quality level | Warning notice | Authorization level | Time of day/weather | Speed | Geography |
|---|---|---|---|---|---|
| S6 | - | A-Full | Any | Any | Any |
| S5 | Medical examination recommended | A-Full | Any | Any | Any |
| S4 | Presumed night blindness | A-Day | Only during the day | Any | Any |
| S3 | - | A-Medium | Only during the day | Up to 100 km/h | No highways |
| S2 | - | A-Low | Only during the day without rain | Up to 100 km/h | No highways Own district only |
| S1 | Please exit the vehicle | A-Block | None | None | None |

Fig. 12

| Steering quality level | Authorization level | Control |
|---|---|---|
| S4A | A-Fullman | Fully manual |
| S3A | A-Nightauto | Fully manual during the day; Up to 25 km/h manual at night, automatic above this |
| S2A | A-Tunnelauto | Automatic in the tunnel; otherwise manual |
| S1A | A-Fullauto | Fully automatic |

Fig. 13

METHOD FOR OPERATING A TECHNICAL SYSTEM THAT MOVES IN AN ENVIRONMENT, WITH ASSIGNMENT OF STEERING QUALITY LEVELS

CROSS-REFERENCE TO RELATED APPLICATIONS

This application claims priority to German Patent Application No. 10 2020 210 261.9, filed Aug. 12, 2020, the entire contents of which are hereby incorporated in full by this reference.

DESCRIPTION

Field of the Invention

The invention relates to a method for operating a technical system in an environment, wherein the technical system can be moved, as a whole or in parts, in the environment by a motor. More particularly, wherein the technical system is a vehicle and the environment comprises a transport network, wherein a person controls movements of the technical system in the environment at least temporarily, and wherein the technical system has a steering assistance system.

Background of the Invention

Vehicles and other technical systems are in many cases at least temporarily controlled by people and moved by a motor in a transport network or another environment. For example, the majority of people in Germany have a license to drive a passenger car or other motor vehicle, and drive their motor vehicle to work or to private and business appointments every day.

Road safety depends in particular on the driving skills of the people who control or steer the vehicles. A not insignificant number of accidents can be traced back to personal driving errors by people. For this reason, practically every country stipulates that in order to obtain a driver's license, people have to take an exam in which they have to prove that they have sufficient driving skills.

However, this exam only shows the driving skills at the time of the exam. Later, driving skills are usually only checked sporadically, for example, after an accident has occurred. However, a person's driving skills can deteriorate over time, for example, through age or illness. Driving skills can also be impaired for a short time, for example, through alcohol consumption or fatigue. Such deterioration often goes unnoticed and a person drives a vehicle even though he is currently unfit to do so, thereby endangering himself and other road users.

In order to reduce such dangers, it is known to regularly check the health of a person, for example, through periodic (for example, annual) medical examinations of bus drivers or pilots, and to revoke the driver's license if they are no longer in sufficient health. Such examinations are complex and expensive, and are therefore only suitable for small groups of people. In addition, they cannot detect short-term impairments or long-term impairments occurring between examinations.

It has also been proposed that a vehicle can only be put into operation if a breath test on a test device installed in the vehicle confirms that the driver is not intoxicated. However, this measure can only offer selective protection against short-term, alcohol-related inability to drive.

It has also become known to observe the driver of a vehicle while driving, for example, by means of a camera, and to warn the driver of signs of fatigue (such as unusual blinking) so that he can take a break. This measure, too, can only offer selective protection.

In addition, so-called "telematics tariffs" have been proposed for motor vehicle insurances, in which the insurance premium is determined depending on the driving behavior of the driver; see, for example, the Internet publication "TelematikVersicherung: Geld sparen moglich, aber es gibt Kehrseiten," downloaded on 8 May 20 at https://www.verbraucherzentrale.de/wissen/geld-versicherungen/weitere-versicherungen/telematikversicherung-geld-sparen-moeglich-aber-es-gibt-kehrseiten-38399.

For this purpose, a GPS black box is installed in the vehicle, or the driver's smartphone determines GPS data while driving the vehicle. In particular, speed, acceleration behavior, and braking behavior are determined from the GPS data. General information about the driving style of a driver can possibly be obtained from the GPS data, but the quality of the driver's driving skills cannot be reliably determined, in particular with regard to the safety of road users in the specific situations driven through. For example, a sharp braking maneuver can be an indication of a (desired) quick reaction in the event of careless behavior by another road user, or an indication of approaching a red traffic light too fast (which is undesired).

SUMMARY OF THE INVENTION

Object of the Invention

It is the object of the invention to allow greater safety in the operation of technical systems, in particular motor vehicles, which are at least temporarily controlled by people in an environment, in particular in a transport network.

According to the invention, this object is achieved by a method for operating a technical system in an environment, wherein the technical system can be moved, as a whole or in parts, in the environment by a motor, in particular wherein the technical system is a vehicle and the environment comprises a transport network, wherein a person controls movements of the technical system in the environment at least temporarily, wherein the technical system has a steering assistance system which a) observes the environment using sensors and, depending on the observed environment, determines reference movement courses for the technical system for future time intervals,
b) registers movement courses of the technical system actually controlled by the person in the time intervals,
c) carries out a comparison between the reference movement courses and the movement courses actually controlled, and
d) depending on the comparison result, assigns one of a plurality of steering quality levels to the person.

Using the present invention, a particularly reliable assertion can be made about the quality of the manual control of a technical system by a person; this quality is expressed in steering quality levels. The method according to the invention provides that, during the operation of the technical system, a reference movement course is determined constantly (repeatedly or continuously) by a steering assistance system which the person is intended to control for an appropriate (or desired) movement of the technical system under the given conditions, including the current environment, in the next upcoming time interval (within reasonable accuracy). The reference movement course corresponds to a movement course as it would also be controlled in a fully automatic or autonomous operation of the technical system under the given conditions (including the current environment). To determine the reference movement course, the steering assistance system constantly monitors the current environment by means of suitable sensors, in particular optical sensors such as cameras or laser scanning systems. Subsequently, the movement course, as it was actually controlled by the person, in the time interval is determined. The reference movement course (determined a priori) and the actual movement course (determined a posteriori) of a particular time interval are then compared with one another. The comparison can be used to determine whether the driver behaved appropriately in the specific situation (or as desired, in accordance with the programming of the steering assistance system). Depending on the degree of correspondence between the actual movement courses and the reference movement courses, different steering quality levels can be assigned.

The steering quality level is assigned according to objective criteria programmed in the steering assistance system. The assignment is based on the behavior of the person (for example, the driver of a motor vehicle) in a multitude of specific situations, which are also predetermined by the current environment (for example, own location and own movement, location and movement of other road users, structural conditions in the environment, road course, weather and lighting conditions, vehicle condition (such as tires), current local traffic regulations, etc.), with the behavior of the person being assessed in particular with regard to safe operation of the technical system. In principle, the steering assistance system within the scope of the invention evaluates substantially the same information about the environment that is also available to the driving person through his senses, in particular optical information about the environment, to determine the reference movement course. The reference movement course can be achieved using control programs known per se, such as are available for automatic or autonomous operation of the technical system. It should be noted that within the scope of the invention, the steering assistance system does not need to be able to determine reference movement courses for all conceivable situations (although this is preferred), but only for a proportion sufficient to assign a steering quality level, e.g., at least 50% of all situations.

The assigned steering quality level is typically the starting point for further measures to increase the safety of the operation of the technical system. The steering quality level can be output as information (for example, as a visual warning notice to people, or as a message to licensing authorities) and/or evaluated for the (future) control of the technical system, for example, to determine the person's control authorization for the technical system in the future. The steering quality level output as information can also contain a description of a presumed physical (health) cause for the assignment and/or a recommendation for action (for example, "Late reaction to more distant environment, ophthalmologist should be consulted"). In particular, it can be provided that an automatic steering system (e.g., AD, ADAS) takes over the control of the technical system in whole or in part if it has been determined that the person is no longer sufficiently able to control the technical system, or alternatively the control capabilities of the automatic steering system are (currently) better than those of the person currently steering.

The steering quality level can be monitored or assigned at a desired or required frequency. The person's steering behavior can be monitored for short-term fluctuations (for example, to recognize journeys under the influence of drugs or alcohol shortly after starting the journey and, if applicable, to prevent further travel), or also monitored for long-term changes (in particular to detect age-related degeneration or creeping illnesses).

Typically, the steering quality level applies after an assignment for a certain minimum duration, for example, at least two hours or at least one day; in individual cases, the steering quality level can also be assigned only for short periods of time, for example, for a period of time between 2 minutes and 20 minutes.

It should be noted that the currently assigned steering quality level for a person within the scope of the invention can decrease over time (e.g., if the person's driving performance decreases due to tiredness, or also due to age or illness, e.g., cataracts), can remain the same (normal case) or can increase (for example, after getting enough sleep or after an eye operation). Depending on the cause, an assignment that has been made can be reset after some time (for example, if it is to be expected that the person could take a sufficient nap).

A reference movement course generally corresponds to a movement course determined by the steering assistance system as being optimal for the (currently observed) environment in order to achieve a predetermined goal to be achieved using the technical system. In the case of a vehicle, the goal can be, for example, a safe and quick journey to a specified destination, or in the case of a surgical robot, performing an operation (surgical intervention) safely and gently on a patient. The reference movement course is typically only determined for a very short period of time, for example, the next 10 seconds or less, and then again and again in order to take into account a change in the (local) environment, in particular due to the movement of the technical system in the environment (including a possible change in the environment caused by the technical system).

The reference movement course and the actually controlled movement course can be recorded by associated (reference and actual) control commands, or alternatively by the temporal development of the (reference and actual) position and orientation of the technical system or a part thereof.

The automatic determination of a reference movement course in step a) can be understood as a result/personification/distillate/fingerprint of the underlying training data of the steering assistance system, which in turn often originate from real, correct scenes/trajectories.

Within the scope of the invention, the person's sensorimotor system can be checked indirectly and monitored or evaluated with regard to its suitability for controlling the technical system.

The assessment according to the invention is based on the actual control of the technical system by the person in situations that actually occurred in practice, so that the person's ability to control can be assessed directly and therefore very meaningfully. Insofar as the environment requires a specific, manually controlled movement sequence (or manual driving style), such as unfavorable road conditions, illegible signs, etc., this is inherently taken into account within the scope of the invention, since the steering assistance system is also based on the current environmental conditions for the reference movement sequence used as a benchmark. Deficits of the person in the control of the technical system, in particular creeping degradation due to age or illness, can be reliably recognized and made known, which can increase safety.

Preferred variants of the invention.

Preferred areas of application.

In a preferred variant of the method according to the invention, the technical system is a vehicle, in particular a road vehicle or an airplane or a drone or a train, and the environment comprises a transport network, in particular a road transport network or an aviation network or a rail network. The invention is very well suited for monitoring the skills of drivers of vehicles of all kinds and thereby making traffic safer. In particular, the invention can prevent accidents. The vehicle is preferably a passenger car, truck, or bus.

Also preferred is a variant in which the technical system is a surgical robot and the environment comprises a patient on whom an operation is being performed, in particular wherein the operation to be carried out is a brain operation or a hip operation. The invention can also increase safety during operations (surgical interventions) by monitoring the surgeon. In particular, reliable detection of fatigue during operations can be very useful.

Variants for carrying out the comparison.

Particularly preferred is a variant which provides that in step c) the steering assistance system determines at least one current deviation parameter from the comparison between the reference movement courses and the actually controlled movement courses, and that in step d) the steering quality level for the person is determined depending on the at least one current deviation parameter. The use of the at least one current deviation parameter simplifies the implementation of the method, and is particularly useful in revealing short-term fluctuations in the person's steering behavior. The at least one current deviation parameter is typically determined by a comparison between the reference movement courses and the actually controlled movement courses over a short (current) period of time, for example, the last 60 seconds or less. This period of time can coincide with the duration of a time interval of a reference movement course, the current deviation parameter being determined once for each time interval; however, it is also possible to select this period of time to be shorter (over a fraction of a time interval) or longer (over a plurality of time intervals). When determining a (particular) deviation parameter, one or more of the available observables (for example, positions, orientations, speeds, accelerations, in each case for the reference movement course and the actual movement course) are evaluated and typically combined and/or weighted. A plurality of current deviation parameters can also be determined, which preferably evaluate different types of deviations of the actual movement course from the reference movement course, for example, for a first deviation parameter relating to the frequency and amplitude of correction movements, and for a second parameter an average linear or quadratic deviation of an observable (e.g., position or orientation of the technical system or a part thereof) from a reference observable. Likewise, it is possible to determine individual deviation parameters only for certain situations, for example, for driving through tight bends, for starting off, or for reversing.

In an advantageous development of this variant, it is provided that in step a), when determining the reference movement course, a confidence level of the reference movement course is also determined, and that when determining the at least one current deviation parameter, a weighting of deviations of the actual movement course from the reference movement course is carried out depending on the confidence level, with deviations being weighted less at lower confidence levels than at higher confidence levels. This means that the assignment of the steering quality levels is more meaningful. If the determination of the reference movement course has a high level of uncertainty or inaccuracy (for example, if the steering assistance system has to rely on outdated map material), deviations of the actual movement course from the reference movement course are given a reduced weighting, since the deviation was possibly justified. Conversely, a certain steering behavior of the person may be absolutely necessary in certain situations (e.g., stopping at a red traffic light), and any deviation from this behavior should then be given particular consideration (weight).

Reference movement courses are advantageously rated with a lower confidence level if they were determined at least partially on the basis of sensor data that are unreliable due to detected or presumed sensor errors or sensor degradations or due to environmental conditions that are unfavorable for the sensor function than when the reference movement courses were determined on the basis of normally reliable sensor data. This ensures that unreliable sensor data can falsify the assignment of the steering quality level less severely.

In another, advantageous development of the above variant, in step d) the steering quality level is determined at least also depending on the absolute magnitude of the at least one current deviation parameter. As a result, short-term fluctuations in the steering behavior of the person can be well recognized or revealed, and absolute quality requirements for the control behavior of people can be taken into account.

A development is also advantageous in which at least one average deviation parameter is determined for the person for the past, and the steering quality level for the person is determined at least also depending on the deviation of the at least one current deviation parameter from the at least one average deviation parameter. In other words, a typical steering behavior of the person (typically based on a plurality of deviation parameters) is determined ("learned") from the past, and if the current steering behavior deviates from the typical steering behavior (which deviation can be observed at short notice, and is in particular severe), the safety quality level is changed if necessary. As a result, relative criteria are taken into account when assigning the safety quality level; in particular, short-term changes in the person's steering behavior (for example, due to alcohol or drug consumption, fatigue, or general stress) can thus be recognized particularly easily. Typically, a change in the steering quality level does not yet take place in the case of individual, isolated deviations of a current deviation parameter from the average deviation parameter ("outliers"), but only when there are a certain number. Here, for example, RANSAC methods can be used, or methods that can otherwise separate the signal from noise with high reliability, for example, also based on deep learning. The average deviation parameter is typically determined over a longer period of time of, for example, 30 days or more, in particular the last 30 days or more (in other cases, for example, the last 6 months or more, in special situations also the last 1 to 24 hours) by averaging the current deviation parameter.

A development is particularly advantageous which provides that at least one current deviation parameter is averaged for a first period of time in the past, whereby at least one base deviation parameter is determined, the first period of time comprising at least 7 days, that this at least one current deviation parameter is averaged for a second period of time, whereby at least one update deviation parameter is determined, the second period of time comprising at least 7 days, that the first period of time is at least 180 days before the second period of time, and that the person's steering quality level is determined at least also depending on the deviation of the at least one update deviation parameter from the at least one base deviation parameter, in particular wherein the second period of time is less than 30 days prior. In other words, the person's typical steering behavior is observed ("learned") over a longer period of time (usually on the basis of a plurality of deviation parameters) for two different periods of time that are at least 60 days, preferably at least 180 days, apart and the safety quality level is changed, if necessary, when the typical steering behavior changes (in particular also slightly). As a result, relative criteria are taken into account when assigning the safety quality level; in particular, long-term changes in the person's steering behavior can thereby be recognized particularly easily and reliably. The comparison of the two periods of time is particularly easy and quick. If a deviation parameter increases noticeably from the first period of time to the second period of time, this is a sign of a long-term deterioration in the person's ability to steer, for example, due to a chronic, worsening disease (e.g., cataracts) or simply due to old age. By virtue of the invention, the long-term (and often slowly progressing) deterioration in the ability to steer can easily be recognized before an accident occurs, and this deterioration can then be counteracted (for example, through medical treatment, the use of (better) glasses or a (better) hearing aid) or can be taken into account when controlling the technical system (e.g., by more automated support for the person when steering, or by restricting human control authority under dangerous conditions in the given case).

A development is likewise advantageous which provides that for the person the time course of the at least one current deviation parameter is observed over an observation period of at least 60 days, preferably at least 180 days, that in the observation period a moving average of the at least one current deviation parameter is formed, the moving average being determined by averaging the at least one current deviation parameter in an averaging interval of at least 7 days, preferably at least 14 days, and that the steering quality level for the person is determined at least also depending on the change in the moving average. In other words, the typical steering behavior of the person for periods of time differently far in the past is observed ("learned") over a longer period of time (usually based on a plurality of deviation parameters and their moving average), and the safety quality level is changed, if necessary, when the typical steering behavior changes (which is observable in the long-term, in particular also slightly). As a result, relative criteria are taken into account when assigning the safety quality level; in particular, by evaluating the moving average, long-term, creeping changes in the steering behavior of the person can be identified particularly easily. If the moving average of a deviation parameter increases slowly over the observation period, this is a sign of a gradual deterioration in the person's ability to steer, for example, due to a chronic, worsening disease (e.g., cataracts) or simply due to old age. Conversely, a falling moving average of a deviation parameter is a sign of an improvement in the ability to steer, for example, when a novice driver is gaining experience. In particular, the invention allows the deterioration of the ability to steer to be easily recognized before an accident occurs, and this deterioration can then be counteracted (for example, through medical treatment, use of (better) glasses or a (better) hearing aid) or can be taken into account when controlling the technical system (e.g., by more automated support for the person when steering, or by restricting human control authority under dangerous conditions in the given case).

An embodiment is also particularly preferred which provides that the technical system is controlled by a plurality of operators alternately, that the steering assistance system has an identification device by means of which a current operator can be automatically identified, in particular through image recognition, and that individual steering quality levels are determined for the respective operators, in particular wherein individual average deviation parameters and/or individual base deviation parameters as well as update deviation parameters and/or individual moving averages are calculated for each operator. This procedure can further increase the safety when operating the technical system, and in particular relative criteria can be taken into account in a simple and meaningful way when assigning the steering quality level, even if a plurality of operators (persons) are using the technical system. Risks inherent in the individual operator (the individual person) can be more easily identified and taken into account. Within the scope of the invention, person-specific profiles can be created—also across different vehicles—which assess the driving ability/safety/health status of different operators. If desired, the profile can also be made available to doctors or licensing authorities or family members or systems (health tracking portals) in addition to the relevant person himself, in compliance with relevant data protection regulations, in order to prepare and/or initiate appropriate action to improve or restore the operational safety of the technical system.

Variants relating to authorization levels.

In an advantageous variant, the steering assistance system, together with the steering quality level, also specifies one of a plurality of authorization levels, whereby a respective authorization level limits the movements of the technical system in the environment which the person can control on the technical system. Different authorization levels limit the person's authorization in different ways, in particular to make an adjustment to the (current) abilities of the person and thus to allow a particularly safe operation of the technical system. In particular, control options that would overwhelm people can be excluded by means of the authorization levels.

A development of this variant is preferred which provides that at least one of the authorization levels limits a maximum speed of the technical system or a part thereof that can be controlled by the person, and/or that at least one of the authorization levels enforces a minimum distance for a distance of the technical system or a part thereof from structures in the environment, which can be controlled by the person, and/or that at least one of the authorization levels limits the environment in which movements of the technical system can be controlled by the person, and/or that at least one of the authorization levels limits the time of day at which movements of the technical system can be controlled by the person. Due to these limitations, many hazards for the person and other people in the environment can be minimized in practice. A typical limitation of the environment in geographical terms is, for example, a prohibition on driving onto freeways or leaving a certain district. A typical limitation of the environment in functional terms is, for example, a ban on driving in rainy weather. A typical restriction on the time of day is a ban on driving a car at night (for example, between 10:00 pm and 6:00 am). By virtue of the authorization level, the movements that can be controlled by a person in the technical system can be restricted according to his current or remaining abilities in order to ensure improved (sufficient) safety. In particular, deficits/degradations recognized for the person (e.g., night blindness) can be taken into account in the authorization level used (e.g., prohibition of manual night journeys). In the (short-term) monitoring, identified deficits/degradations (e.g., rapid fatigue) can also be used to give special weighting to deviation parameters or observables (e.g., frequency of corrective movements).

A development is particularly advantageous in which at least one of the authorization levels comprises a complete blocking of the further control of movements of the technical system by the person. By this means a "fail-safe" state (safe state in the event of failure) can be achieved; the blocking is often accompanied by an automatic emergency control, for example, emergency braking, in order to bring the technical system into a safe state.

A variant is also advantageous in which the steering assistance system is designed as an automatic steering system by means of which movements of the technical system in the environment can be controlled automatically at least temporarily, in particular wherein the automatic steering system is operated in a "silent mode" in step a) to determine the reference movement courses for the technical system. As a result, the steering assistance system is able to support the person in the operation of the technical system by means of automatic control commands; for many technical systems, inexpensive automatic steering systems that can be used within the scope of the invention are commercially available. In "silent mode," control signals (control commands) generated or prepared by the automatic steering system are not implemented by a motor; the control signals (or an underlying, planned reference movement course) are only used for comparison with the human control commands (or the actual movement course resulting therefrom). By taking over control functions, a "fail operational" system (operational status in the event of failure) can be achieved so that the technical system is kept in operation even in the event of a human failure (e.g., in the event of an epileptic fit or a heart attack). For this purpose, it can be useful to determine and evaluate one or more current deviation parameters over comparatively short periods of time, for example, over 3 to 15 seconds.

A development is particularly preferred, wherein the steering assistance system, together with the steering quality level, also specifies one of a plurality of authorization levels, and which provides that the automatic steering system takes over the control of the movements of the technical system partially or completely in at least one of the authorization levels, in particular wherein the degree to which the automatic steering system takes over the control of the movements of the technical system depends on the environment in at least one of the authorization levels, and in particular wherein different authorization levels are correlated with different SAE levels. This allows targeted support for the person in operating the technical system. The automatic steering system can specifically help in situations with automatic control commands when the person is no longer able to (safely) control the technical system.

Variants to optimize the comparison.

In a preferred variant, the assignment of the steering quality level also includes information from one or more sensors that are arranged in the environment and observe the technical system from the outside and/or the environment of the technical system, in particular wherein the technical system is a vehicle, and the environment comprises a transport network, and the sensors arranged in the environment comprise sensors or cameras permanently installed in the transport network and/or sensors or cameras installed on other vehicles. The additional information from the sensors arranged in the environment generally makes it possible to better distinguish between desired (safe) and less desired (less safe) control behavior of the person, for example, by weighting deviation parameters, and the assignment of the steering quality level becomes even more meaningful. Typical environmental sensors can be traffic monitoring cameras, for example, or the sensors on the vehicles of other road users.

A variant is also advantageous in which the assignment of the steering quality level also includes information from one or more sensors of the technical system and/or the environment, which determine a reaction of the environment to the actual movement course of the technical system. This additional information also generally makes it possible to better distinguish between desired (safe) and less desired (less safe) steering behavior of the person, for example, by weighting deviation parameters, and the assignment of the steering quality level becomes even more meaningful. For example, the acceleration and braking behavior of other road users can be evaluated as a reaction to the actual movement course. If, for example, a camera on a controlled vehicle observes that a pedestrian has jumped away in front of the controlled vehicle, this is usually an indication that the driver has not kept a sufficient distance from the pedestrian.

In an advantageous variant, it is also provided that in step a) a plurality of reference movement courses are determined at least in individual situations, that in step c) there is a comparison of the actually controlled movement course with each of the reference movement courses for the associated situation, and that only one of the comparisons is taken into account in step d) for determining the steering quality level, in particular, in step d) only that comparison is taken into account in which the actual movement course exhibits the smallest deviations from the reference movement course. Preferably, the steering assistance system in step a) (in particular in silent mode), if necessary, generates a plurality of hypotheses (or reference movement courses) simultaneously (multimodal probability density function—PDF), since one sole path (movement course) is not necessarily always the correct one, but in the given situation different solutions can be similarly safe with regard to KPIs (key performance indicators/deviation parameters). The degradation of the person (driver) can be compared with the closest correct/permissible/possible solution of the machine (e.g., trajectory), not just with one possible solution or the best solution of the machine. This avoids incorrectly assuming that the person has poor control behavior, and the assignment of the steering quality level becomes particularly meaningful.

A variant is also preferred in which the assignment of the steering quality level also includes information from one or more sensors that observe the person when the movements of the technical system are controlled. Using this additional information, precarious health conditions of the person, in particular short-term impairments such as fatigue or drug consumption, can be recognized even more reliably, and the assignment of the steering quality level can achieve greater informative value. The sensors that observe the person can be arranged on the technical system (for example, a driver's camera, in particular to determine the position and orientation of the head, the direction in which the eyes are looking, or the blinking and frequency thereof) and/or provided independently of the technical system (such as a "smart watch" or other "health wearables" that the person wears and that typically transmit their data wirelessly to the steering assistance system, such as pulse data or ECG data). As part of the observation of the person, a prognosis of further human movements to be observed can also be included, which is taken into account for the assignment of the steering quality level. For the prognosis, for example, "particle filter"/"sequential Monte Carlo methods" can be used, which make a prediction for the future based on the measurement and model.

A variant is also advantageous in which the assignment of the steering quality level to the person also includes information that was previously obtained with at least one further technical system from comparing reference movement courses and actually controlled movement courses of said person on said at least one further technical system. As a result, relative criteria can be used when assigning the steering quality level with greater accuracy or on a broader database. In particular, long-term degradations can be recognized more effectively. For example, information obtained about the driving behavior of a certain person on different vehicles within the scope of the invention can be combined, for example, in order to determine the typical driving behavior in the past.

The scope of the present invention also includes a technical system, in particular a vehicle, comprising a steering assistance system, designed to carry out a method according to the invention described above. The technical system can be operated particularly safely.

Further advantages of the invention can be found in the description and the drawings. Likewise, according to the invention, the aforementioned features and those which are to be explained below can each be used individually for themselves or for a plurality of combinations of any kind. The embodiments shown and described are not to be understood as an exhaustive enumeration but rather have exemplary character for the description of the invention.

BRIEF DESCRIPTION OF THE DRAWINGS

FIG. 7 shows the road intersection of FIG. 5 with two alternative, planned trajectories for the invention;

FIG. 12 shows an exemplary tabular overview of steering quality levels for the invention, which correlate with authorization levels;

FIG. 13 shows a further, exemplary tabular overview of steering quality levels for the invention, which correlate with authorization levels and different levels of automatic control of the technical system;

DETAILED DESCRIPTION OF THE PREFERRED EMBODIMENTS

Figure 1:
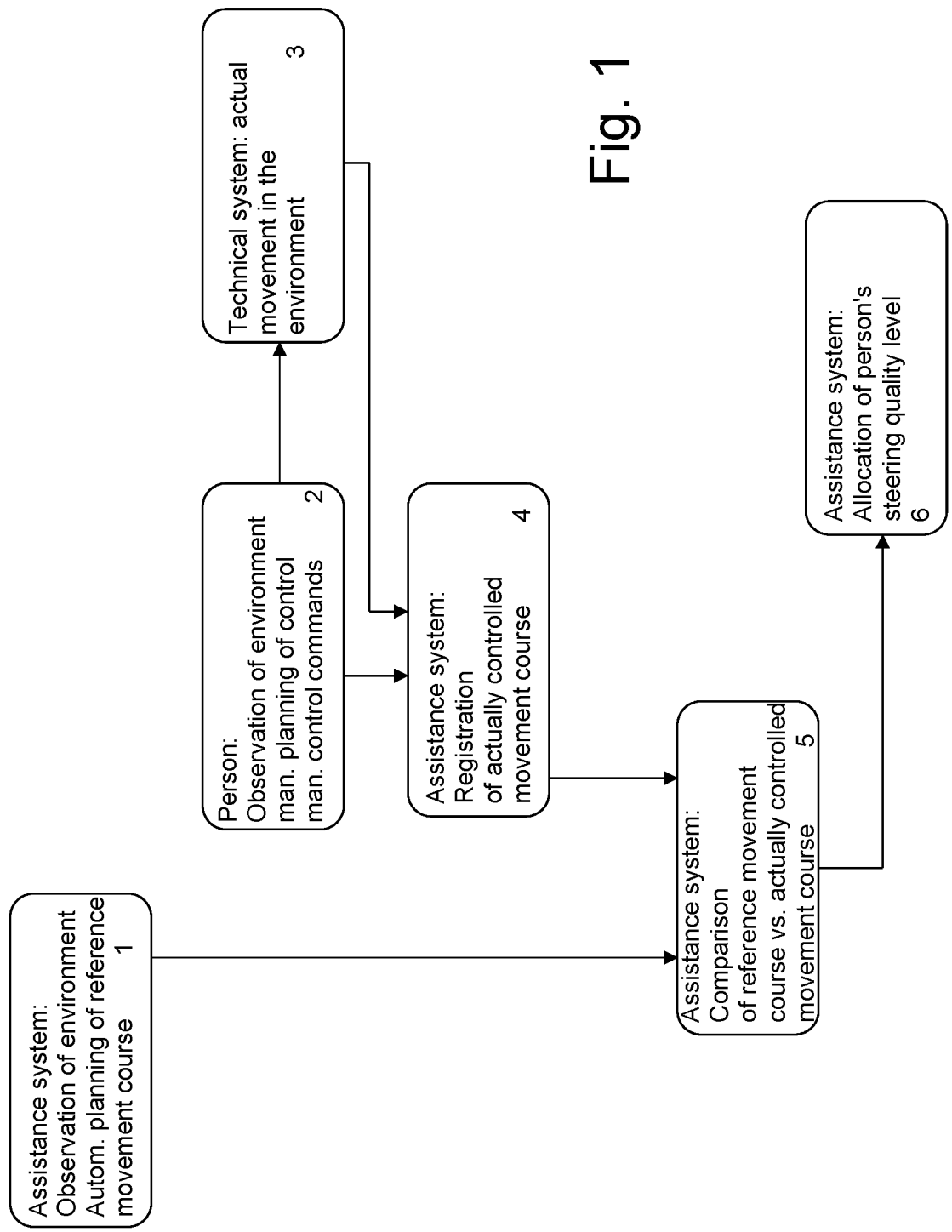
FIG. 1 shows a schematic flow diagram of a first variant of the operating method of a technical system according to the invention, with allocation of a steering quality level.

FIG. 1 illustrates schematically the sequence of the operating method according to the invention in a first, simple variant.

A technical system, for example, a vehicle (see, for example, FIG. 14) or a surgical robot (see, for example, FIG. 15), is located in an environment and is intended to be used for a given task, for example, driving in a transport network or for performing an operation on a patient. The technical system has a steering assistance system which observes the environment using sensors and, depending on the state of the environment (and the intended task), plans or suggests 1 a reference movement course for the technical system. The planning of the reference movement course relates to a future time interval of typically 10 seconds or less. The planned reference movement course contains, in particular, information about the position and orientation (and thus also about the speed and acceleration) of the technical system relative to the environment detected by the sensors at the time of the start of the movement until the end of the time interval.

It should be noted that the technical system can be movable as a whole (like a vehicle) or in parts (like the arms of a surgical robot); the movements of the technical system substantially take place by means of one or more motors.

A person also observes the environment (wherein he can use technical aids such as cameras and screens), mentally plans controlling the technical system and finally controls movements on the technical system by means of control commands 2, which are then substantially converted into an actual movement of the technical system by means of the motor or motors 3.

The steering assistance system then uses the control commands and/or a sensor (typically belonging to the technical system) to determine the actually controlled movement course of the technical system 4. The same time interval for which the reference movement course was created is recorded.

The steering assistance system then compares the movement course actually controlled with the reference movement course 5. The comparison can be used to determine whether the person has carried out an appropriate (or desired, in particular safe) control of the technical system during the time interval, in response to the situation given at the beginning of the time interval.

The comparison of the reference movement course and the movement course actually controlled is carried out for a large number of time intervals. The examined time intervals can also overlap.

From the comparison information, the steering assistance system finally assigns a steering quality level for the person who has controlled the actually controlled movement processes 6.

The steering quality level of the person can be updated depending on the person's further steering behavior.

The determined steering quality level can be made known to the person, for example, by means of an optical display or an acoustic announcement. Alternatively or additionally, information resulting from the steering quality level, for example, about the person's state of health, can be made known, for example, an indication of poor sensory performance of a certain sensory organ, for example, one eye or both eyes. Preferably, together with the steering quality level, an authorization level is also assigned which defines the extent to which the classified person is authorized to control the technical system in the future (see, for example, FIGS. 12 and 13 in this regard).

Figure 2:
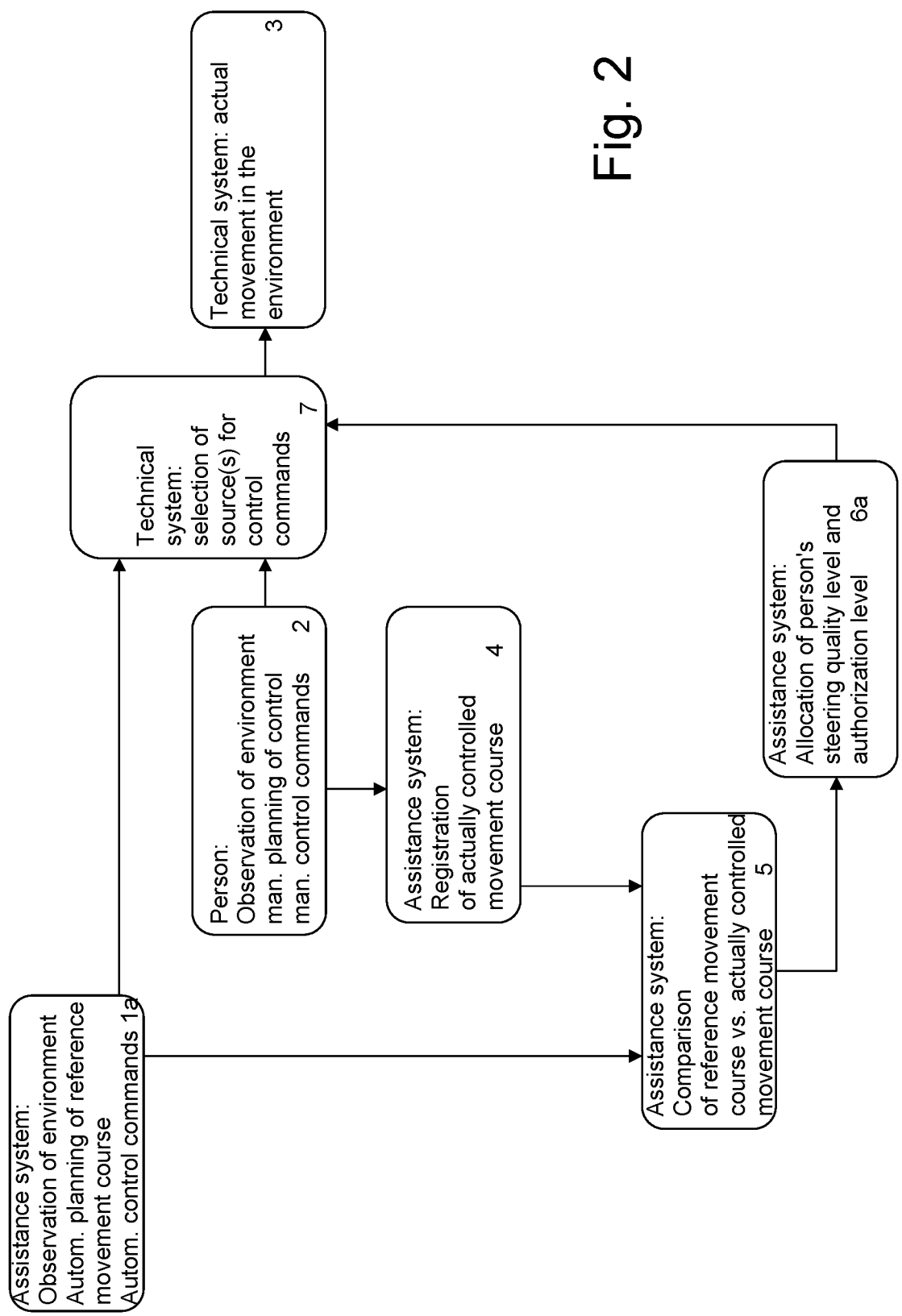
FIG. 2 shows a schematic flow diagram of a second variant of the operating method of a technical system according to the invention, with allocation of a steering quality level and an authorization level.

FIG. 2 illustrates a second variant of the method according to the invention, in which the steering assistance system, as an automatic steering system, can assume at least some of the control functions of the technical system, and authorization levels are also determined by the steering assistance system. Only the substantial differences from FIG. 1 are explained.

In the second variant, the steering assistance system not only plans a reference movement course based on the observation of the environment, but also creates automatic control commands for the technical system 1a. In addition, the steering assistance system allocates, together with the steering quality level, also an authorization level for controlling the technical system by the person 6a. Depending on the authorization level, the technical system then only accepts control commands from the source or sources assigned by the authorization level 7, which are then converted into the actual movement of the technical system 3.

It should be noted that the scope of authorization levels can range from fully manual operation to fully automatic operation, and can also comprise mixed levels so that the technical system can be controlled partly by the person and partly by the steering assistance system. The steering assistance system can specifically support the person in situations in which he would be overwhelmed by controlling the technical system (e.g., due to physical disabilities), but otherwise leave control to the person.

Figure 3:
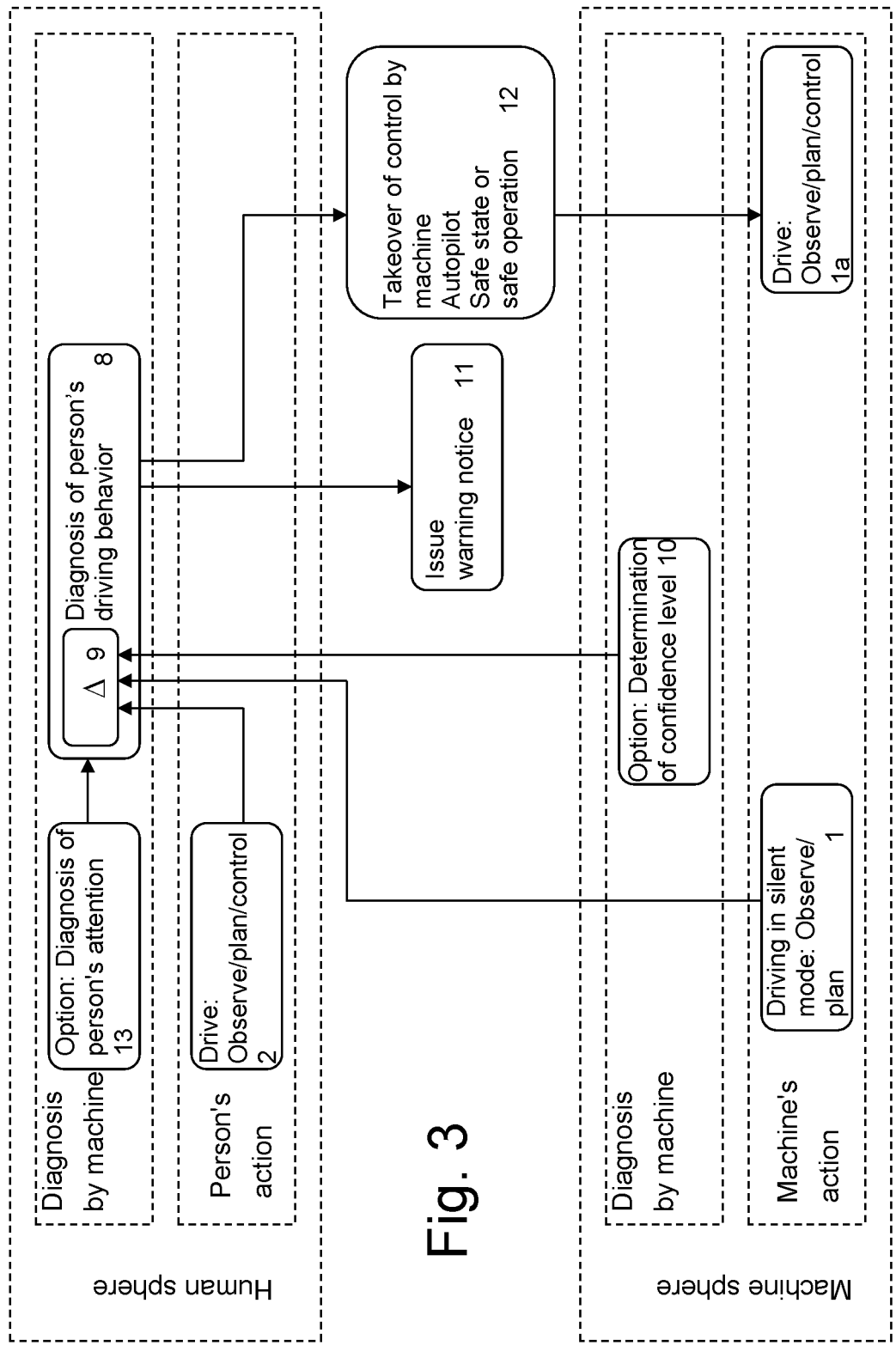
FIG. 3 shows, in a schematic overview, how the invention is integrated in the human sphere and the machine sphere.

The invention thus connects the sphere of a person and the sphere of a machine (represented by the technical system including the steering assistance system), as illustrated in FIG. 3, with regard to an example in which the technical system is a vehicle that is controlled by a person.

In the initial situation, the person acts while driving the vehicle, whereby the person observes the environment, plans the steering, and assumes control 2. At the same time, the machine is operating in "silent mode"; the machine observes the environment and plans the journey 1, optionally including the creation of control commands, which are not implemented in the silent mode though. The comparison of the automatically planned reference movement course and the movement course actually controlled by the person forms the basis for the diagnosis (assessment) of the person's driving behavior 8 within the scope of the invention. In particular, differences (deviations) 9 between the actually manually controlled movement course and the machine-planned reference movement course are evaluated.

Optionally, a confidence level can also be determined for the automatically planned reference movement course 10. If the machine has an indication that the suggested reference movement course is possibly incorrect, this is to be taken into account as information in the difference formation 9 or, more generally, in the diagnosis 8, in order to minimize the probability of an incorrect assessment of the person. Since the reference movement course is based on the observation of the environment using sensors, sensors that function only to a limited extent (e.g., are dirty) can justify a downgrading of the confidence level.

In general, the diagnosis 8 includes the assignment of a steering quality level to the person. Warning notices 11 can be created on this basis, in particular relating to the person's presumed state of health. If necessary, the machine can take over partial or complete control, in which the technical system is transferred to a safe state (fail-safe, e.g., by automatically stopping the vehicle) or transferred to safe operation (safe-operational, e.g., control is taken over by an ADAS) 12. In the latter case, the action of the machine is expanded in that the machine completely takes over the driving including observing the environment, planning the movement, and controlling the movement of the technical system 1a. This is especially necessary if the person has noticeably failed to control the technical system (e.g., due to a heart attack or drug-induced intoxication).

The diagnosis 8 can be supplemented by information that goes beyond the actual driving behavior of the person compared to the automatically generated suggestion. For example, it is optionally possible to observe the person directly in order to find out about his alertness or fitness 13. For this purpose, the person can be observed in particular using a camera or a laser system, in particular with regard to the position of the head or blinking of the eye. If the person's field of vision is no longer directed toward the road for a certain period of time, but rather toward the floor of the vehicle or his smartphone, for example, or if their eyelids are closed for a certain period of time, this can (in addition to the lack of necessary manual control commands) ensure an assignment of a steering quality level.

Within the scope of the invention, it is possible to objectively observe a person's driving behavior both in the short term and in the long term and thereby to verify that the person can safely drive the vehicle. If the observation results in indications that a person can no longer drive the vehicle safely, these indications can be used to increase safety. An automatic system then preferably takes over the control of the technical system, in whole or in part. Where this is not possible, the control of the technical system (use) by the person can be blocked altogether. Alternatively or additionally, a competent authority (such as the driver's license office) can be informed, who can then check the suitability of the person to control the technical system; this can, if necessary, result in a full revocation of the driver's license or a gradual revocation of the driver's license, for example, restriction to autonomous vehicles of a certain SAE level.

Figure 4:
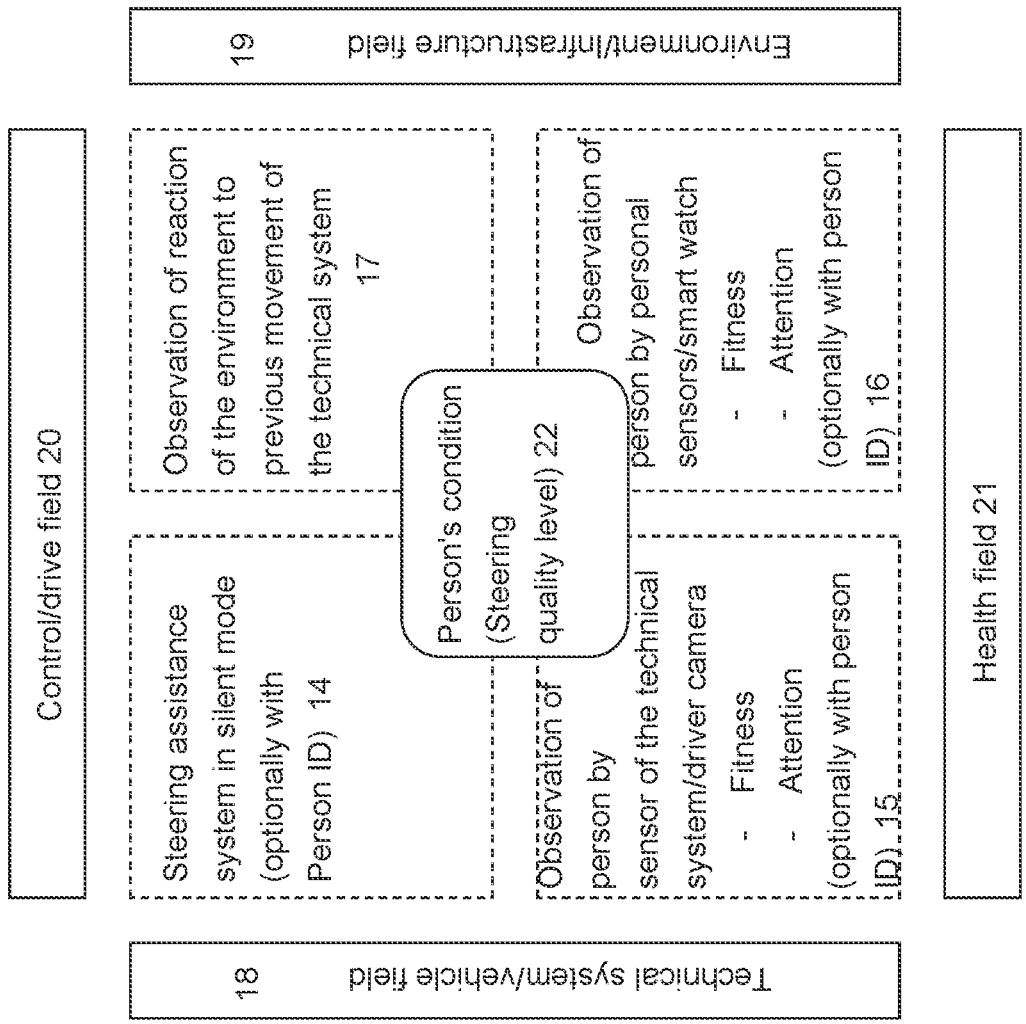
FIG. 4 shows schematically the integration of the invention in the fields of technical system, control, health, and environment.

FIG. 4 summarizes the possibilities for determining the condition of the person 22, expressed by the steering quality level which the person achieves, within the scope of the invention.

The starting point is the steering assistance system in silent mode 14, which compares its planned reference movement courses with the actual movement courses controlled by a person. Furthermore, the person can be observed by one or more sensors of the technical system, for example, a driver's camera, by means of which the fitness and attention of the driver can be monitored directly 15. These two measures are in the field of the technical system 18.

Further, the person can be monitored using personal sensors (which are not part of the technical system), such as a smart watch or other health wearables, in order to obtain further information about the fitness and alertness of the person 16. If available, a medical file about the person can also be made available at this point (in particular via an electronic platform). Furthermore, it is possible to monitor the vehicle by means of sensors in the environment in order to determine how the environment (e.g., other road users) reacts to the drive controlled by the person 17, or how the environment assesses said drive. In particular, information from sensors of other road users or stationary sensors (for example, traffic monitoring cameras) can be used here. If, for example, other road users have to apply emergency braking when they encounter the vehicle controlled by the person, or if pedestrians had to wait at the zebra crossing despite having priority when the vehicle passed the zebra crossing, this indicates a poor steering quality level for the person. These two measures are in the field of the environment/infrastructure (outside of the technical system) 19.

The invention can thus combine information from the field of control or driving 20 (cf. information 14, 17) and the field of immediate health 21 (cf. information 15, 16) in order to determine the state of the person 22 with regard to the quality of his steering behavior particularly reliably. It should be noted that the condition of the person or his steering quality level can in particular also be ascertained by means of estimates using Bayes' theorem.

Figure 5:
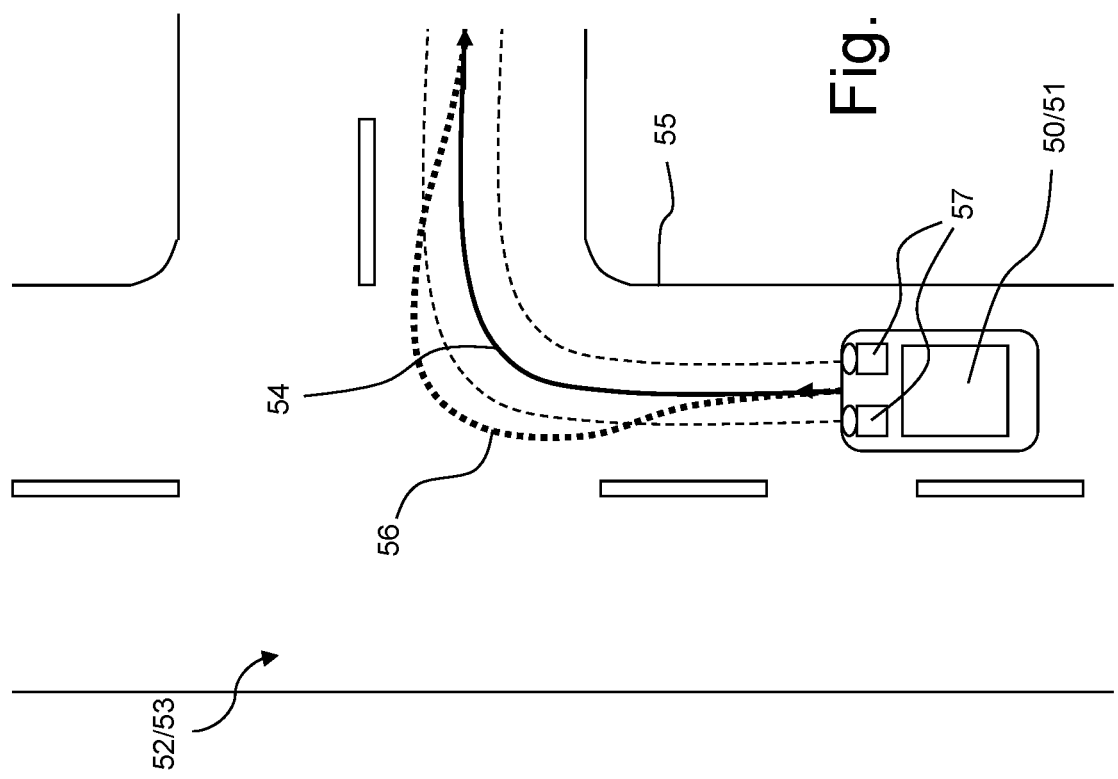
FIG. 5 illustrates schematically the determination of a deviation parameter using the example of machine-planned and manually, actually controlled trajectories of the movement of a vehicle at a road intersection.

FIG. 5 illustrates, by way of example, the determination of a current deviation parameter on the basis of an example of movement courses of a car 50 at a road intersection (T intersection) for the invention.

A technical system 50, which is designed here as a vehicle 51 in the form of a passenger car, is located in a local environment 52 in the form of a road network 53 in the area of a T intersection. The vehicle 51 intends to turn right at the T intersection in accordance with a destination entered into a steering assistance system of the vehicle 51.

The steering assistance system calculates a reference movement course 54 (shown here with bold lines) for the vehicle 51, here in the form of a reference trajectory of the vehicle 51 in the environment 52 that turns safely, for a future time interval of, in this case, approx. 10 seconds. The calculation takes place on the basis of the data from sensors 57 of the technical system 50 or the steering assistance system, which constantly observe the environment 52 and in particular also detect and measure the T intersection.

The reference trajectory here relates to a center of the vehicle 51 and describes a right-hand bend in which the vehicle 51 initially drives forward slightly into the T intersection and then turns gently to the right. The distance from the roadside 55 remains approximately the same in the reference trajectory.

In the vehicle 51 there is a person as a driver (not shown in more detail) who manually steers the vehicle 51 when turning. In the time interval for which the reference movement course 54 was calculated, the vehicle 51 drives through 51 an actually controlled movement course 56 (shown here with dots). This actual movement course 56, corresponding to an actual trajectory of the vehicle 51 in the environment 52, deviates noticeably from the reference movement course 54: in the actual trajectory, the vehicle 51 first moves slightly to the left and slightly into the opposite lane ("swinging out"), and then swings into the side street with a slightly larger arc than in the reference trajectory.

From the actually controlled movement course 56 and the reference movement course, a deviation of the position of the vehicle 51 (or the vehicle center) in the direction perpendicular to the course of the reference movement course 54 can serve as an observable (observed variable) y. This observable y is plotted in FIG. 6 as a function of time t in the time interval.

The observable y begins at $t_{start}$ initially at zero and gradually rises to a maximum, and then falls again until, at the end of the time interval at $t_{end}$, the observable y is again approximately at zero, i.e., the vehicle is finally swiveled back to the "ideal line."

For example, a current deviation parameter can be determined from the observable y for the observed time interval between $t_{start}$ and $t_{end}$ by calculating the average (linear) deviation of the position of the vehicle perpendicular to the reference movement course, i.e., the average value of y between $t_{start}$ and $t_{end}$, is determined. This average y value is referred to here as the first deviation parameter with CDP1.

If the steering behavior is good, CDP1 should be close to "zero." The clearly positive value of CDP1 indicates that the driver misjudged somewhat when turning and drove an undesirably wide line (which possibly endangers oncoming traffic or any overtaking vehicles).

Figure 6:
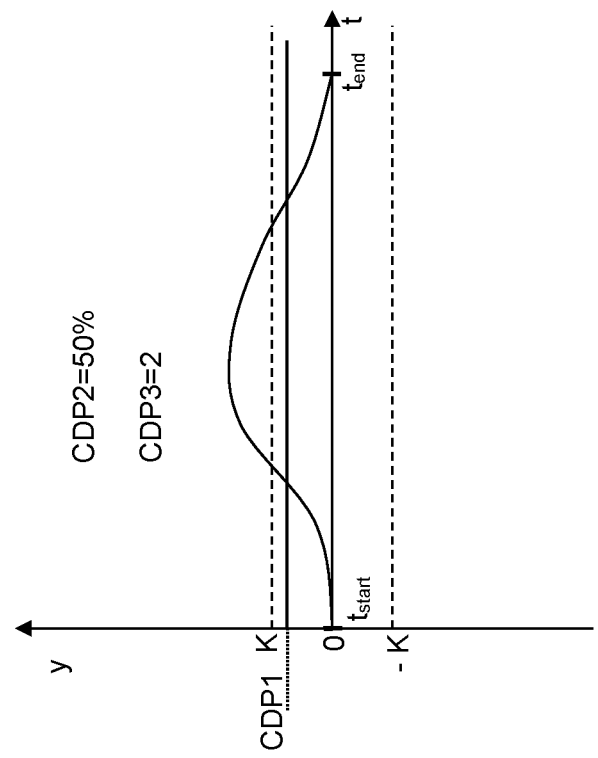
FIG. 6 shows the actual, manually controlled position of the vehicle of FIG. 5 relative to the machine-planned trajectory in a diagram as a function of time.

In FIGS. 5 and 6, a corridor is shown here with dashed lines, within which the vehicle 51 should be located when turning so as not to endanger other road users; this corridor corresponds to a y-value between the limits K and −K. If this vehicle leaves this corridor, the route of other road users may be crossed. A current deviation parameter can, for example, also be determined by the proportion of time in the time interval between $t_{start}$ and $t_{end}$ for which the vehicle was outside the corridor. In the example shown in FIG. 6, this proportion was approximately 50%. This proportion is referred to here as the second current deviation parameter with CDP2.

If the steering behavior is good, this CDP2 should be 0%. The high CDP2 value of 50% indicates that the driver may have endangered other road users for a considerable period of time when turning.

Another current deviation parameter could be, for example, how often the actually controlled movement course has crossed the limits of the corridor (for K and −K) around the reference movement course in the time interval (or more generally per time); this third current deviation parameter is referred to as CDP3 here. This corresponds to a frequency of sharp corrective movements, as they are often observed under the influence of alcohol ("swerving"). In the example shown in FIGS. 5 and 6, the limits are exceeded twice, i.e., CDP3=2, corresponding to such a correction.

If the steering behavior is good, CDP3 should be zero, although a certain low frequency of corrective movements, for example, up to two corrective movements per minute or (with a time interval of 10 seconds) 0.33 per time interval would still be normal.

In the examples shown, the relevant current deviation parameter was determined exactly once for an observed time interval (for which a reference movement course was determined in each case). This is a preferred procedure; however, it is also possible to determine a current deviation parameter a plurality of times within a time interval, or to determine a current deviation parameter only once for a plurality of time intervals together.

In some situations there is not just one appropriate movement course, but a plurality thereof. In this case, the steering assistance system can determine a plurality of reference movement courses. FIG. 7 shows this for the road intersection already shown in FIG. 5. The vehicle 51 can, within the framework of the road traffic regulations, both turn right (reference movement course 54) or continue straight ahead (reference movement course 54a). When determining the deviation parameters, that reference movement course 54, 54a of the vehicle 51 is then used as the basis with which the smallest deviation of the actually controlled movement course is obtained.

FIGS. 8 to 11 illustrate possibilities for obtaining criteria for the assignment of steering quality levels for the person from obtained values of current deviation parameters, which were obtained during the manual control of a technical system by the person.

Figure 8:
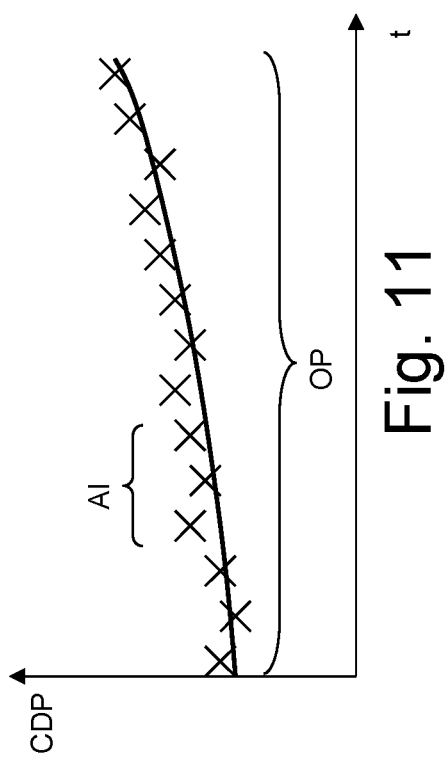
FIG. 8 illustrates, by way of example, the evaluation of a deviation parameter on the basis of the absolute magnitude of the current deviation parameter for the invention.

FIG. 8 shows, in a diagram, various values of a current deviation parameter CDP, which were determined as a function of time t. The values of CDP here are all in a narrow range, close to zero, and well below an absolute threshold value ATV. However, the last measured value is above this threshold value ATV. This is an indication of a serious driving error, which leads to a lowering of the steering quality level.

In this example, the current deviation parameter can be, for example, a frequency of sharp corrective movements, and exceeding the absolute threshold value indicates the current influence of alcohol.

Figure 9:
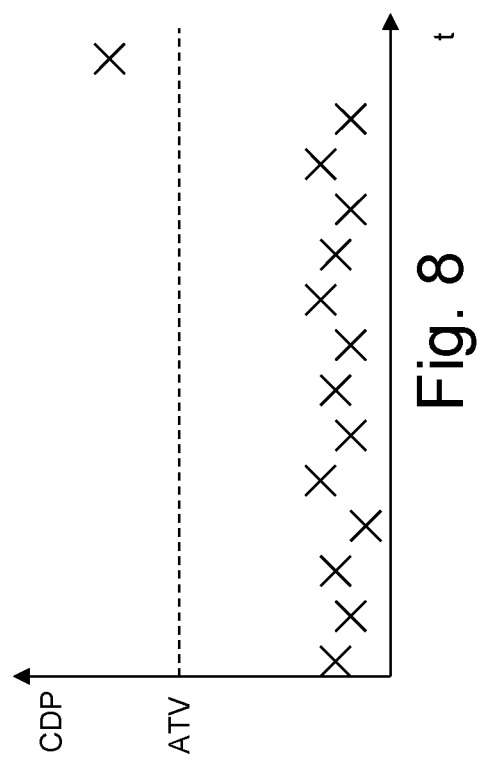
FIG. 9 illustrates, by way of example, the evaluation of a deviation parameter on the basis of a person-specific average deviation parameter and the current deviation parameter.

Some people have a personal driving style, and therefore some values of deviation parameters are normal for one driver, but unusual for another driver. This situation is illustrated in FIG. 9.

A first driver, represented by x symbols, shows a current deviation parameter CDP with a time average value (average deviation parameter) of A1. A second driver, represented by + symbols, shows a current deviation parameter CDP with a time average (average deviation parameter) of A2. The value of the current deviation parameter shown at reference number 90 is completely normal for the second driver (he is exactly at his average value A2), but is an indication of problems for the first driver, because it is significantly above his average value A1. Correspondingly, a specific (relative or absolute) deviation of a value of a current deviation parameter from his average value, if this deviation exceeds, for example, certain threshold values, can be used to change the steering quality level.

A typical example of a current deviation parameter to be evaluated relatively in this way is the time that elapses between a traffic light switching to "green" and the driver (operator) starting the vehicle.

Figure 10:
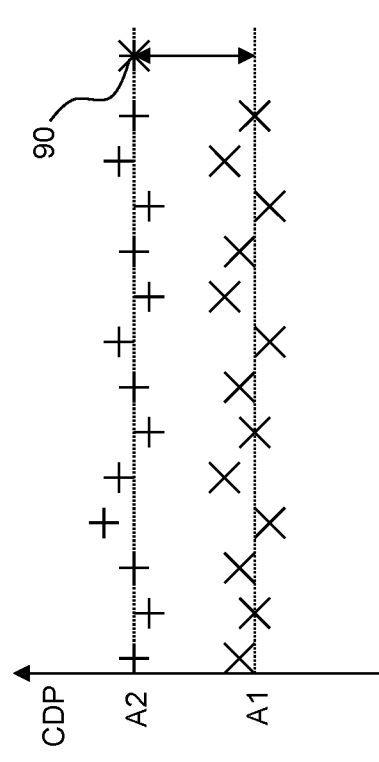
FIG. 10 illustrates, by way of example, the evaluation of a deviation parameter on the basis of a base deviation parameter and an update deviation parameter.

FIG. 10 illustrates a large number of values of a current deviation parameter CDP which were measured in the past over the time t. In order to reveal long-term changes in a person's typical steering behavior, the current deviation parameter CDP was averaged in a first period of time P1; this average value is the base deviation parameter BDP. In a second, later period of time P2, the values of the current deviation parameter CDP were also averaged; this average value is the update deviation parameter UDP.

The period of time P1 is preferably at least 180 days before the period of time P2, and the two periods of time P1 and P2 are preferably at least 14 days long.

If the steering behavior of the observed person remains the same, BDP and UDP should be the same or almost the same. If UDP changes significantly compared to BDP, for example, the change exceeds a certain relative or absolute threshold value, the steering quality level can be adjusted. The difference between UDP and BDP is an indication of physical or mental changes in the examined person, which can be due in particular to age or illness (or recovery from an illness).

Figure 11:
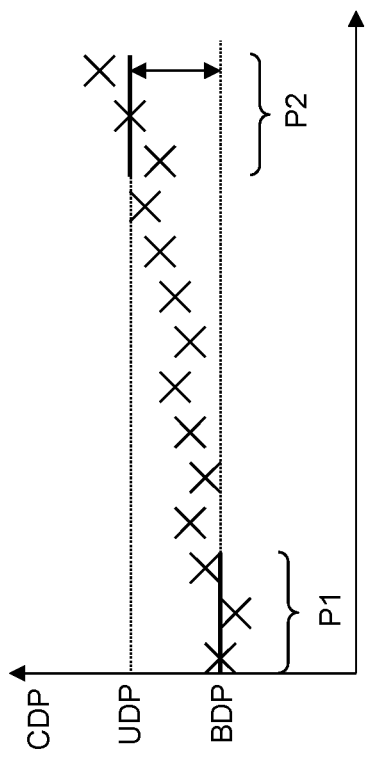
FIG. 11 illustrates, by way of example, the evaluation of a deviation parameter on the basis of a moving average of the current deviation parameter.

FIG. 11 likewise illustrates a large number of values of a current deviation parameter CDP, which were measured in the past over the time t in an observation period OP of here 180 days, for example. In order to reveal long-term changes in a person's typical steering behavior, a moving average (see solid black line) was formed from the values of CDP, wherein the averaging is carried out locally in an averaging interval AI of 14 days here. As can be easily seen, the moving average increases slightly with time t, which indicates a creeping change in the person driving, for example, a slowly progressing disease such as cataracts (clouding of the lens in the eye).

In order to trigger a change in the steering quality level, it can be checked, for example, whether the average gradient of the moving average exceeds a (mostly positive) threshold value (i.e., the moving average increases at a certain minimum speed). Alternatively, it is also possible to simply check whether the moving average has changed (typically since the beginning of the observation of the operator) by more than a minimum value.

A typical current deviation parameter for the examples of FIGS. 10 and 11 is the distance at which a driver reacts to a traffic sign (such as a new speed limit).

It goes without saying that the observation and evaluation of relative changes in current deviation parameters over time, as provided in FIGS. 9 to 11, must be recorded separately for different operators (persons/drivers); preferably, the controlling operator is automatically recognized in the technical system, for example, by means of a driver's camera.

FIG. 12 shows a table in which, by way of example, six steering quality levels that a steering assistance system can assign within the scope of the invention are listed. The steering quality level is also accompanied here by an authorization level within the framework of which a person (after assignment) is allowed to control the technical system.

In the table of FIG. 12, the highest steering quality level is S6, in which the steering behavior of the person is recognized as being without any objection. This is accompanied by the authorization level A-Full, which authorizes the manual control of the technical system, in this case a vehicle, at all times of the day and in all weather conditions, at any speed and without geographical restrictions.

In steering quality level S5, full authorization to drive is still granted in accordance with authorization level A-Full, but first signs of physical impairment have been recognized, and therefore a warning notice is issued with the recommendation to carry out a physical examination at a doctor. For example, new glasses with a newly adjusted prescription could solve the problem.

In the steering quality level S4, it has previously been recognized that the person commits serious control errors in the dark. The assigned authorization level A-Day is therefore restricted in such a way that the vehicle can only be controlled manually during the day (if there is sufficient light), but then without any restriction in terms of speed or geography. At night, however, the person is no longer allowed to start or move the vehicle (e.g., by blocking the ignition). It makes sense to issue a warning about presumed night blindness.

In steering stage S3, it has been recognized that the driver has difficulties in correctly assessing the speeds of other road users, in particular when the speeds are high or the lighting conditions are poor. The associated authorization level A-Medium limits driving to the day, to speeds of up to 100 km/h and on routes without a freeway. This protects the driver from dangerous situations.

In the steering quality level S2, even more serious deficits in the person's steering behavior have been identified. An unsafe driving style has been identified in poor visibility or weather conditions and in unfamiliar environments. Therefore, in the associated authorization level A-Low, the driving authorization is limited to the day and good weather conditions (no visual obstruction due to rain) and to speeds of up to 100 km/h; in addition, the vehicle may only be driven in the own district and not on freeways. This authorization level is helpful for many seniors in order to avoid dangerous situations for them.

In the steering quality level S1, the steering behavior last observed is so critical that a further journey with the vehicle appears to be altogether too dangerous. In the associated authorization level A-Block, the journey is completely blocked and the driver is asked to exit the vehicle. This level is appropriate, for example, if the driver has been recognized as drunk and incapable.

FIG. 13 shows a further table with exemplary steering quality levels for the invention. Authorization levels are also assigned and the steering assistance system can partially or completely take over control of the vehicle.

In the steering quality level S4A, the steering behavior of the examined person is flawless, and he is entitled to fully manual control of the vehicle in the authorization level A-Fullman. No automatic controls are active (unless the driver also specifies this at his request, for example for reasons of comfort or for additional safety).

In the steering quality level S3A, it has previously been recognized that the driver is night-blind and that, in the dark, the environment of the vehicle can only be perceived imprecisely and/or late. In the associated authorization level A-Nightauto, the driver is allowed to control the car fully manually during the day, but only up to a speed of 25 km/h at night. Above that speed, the steering assistance system (ADAS) takes over control of the vehicle.

In the steering quality level S2A, it has been recognized that the driver tends to suffer panic attacks in tunnels and threatens to lose control of the vehicle. In the associated authorization level A-Tunnelauto, the steering assistance system therefore completely takes over the control of the vehicle in tunnels. Outside of tunnels, the driver can drive the vehicle manually himself.

In the steering quality level S1A, it has been found that the driver is not able to safely control the vehicle, for example, as a result of being drunk. The associated authorization level A-Fullauto stipulates mandatory, complete operation of the vehicle by the automatic control commands of the steering assistance system. This means that the vehicle can still be used, albeit only in automatic mode.

It should be noted at this point that it is also conceivable to have persons propose control commands (e.g., by actuating steering controls) during partially or fully automatic operation of the technical system, but not to use these control commands to control the technical system, but instead automatically generated control commands. In this state, by comparing the control commands proposed by the person with the actually executed control commands (or associated movement courses), it is possible to check whether the person's ability to steer has improved again after the person's steering quality level has been downgraded. If so, the steering quality level can also be upgraded again.

Figure 14:
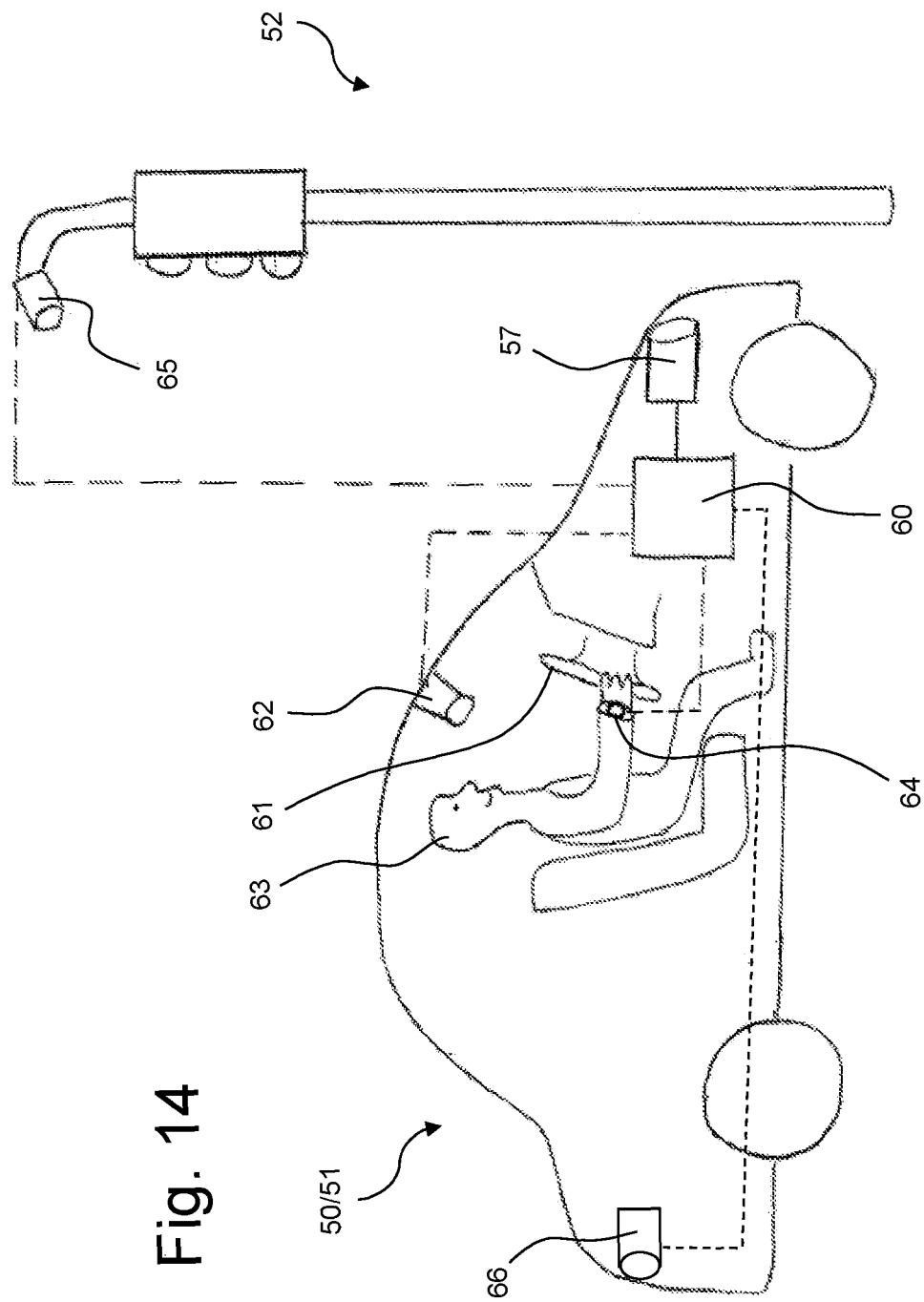
FIG. 14 illustrates, by way of example and schematically, a technical system for the invention designed as a vehicle.

FIG. 14 illustrates, in a schematic representation, a typical technical system 50 in the form of a vehicle 51, here an automobile, for the invention.

The vehicle 51 is controlled (driven) by a person (driver) 63 by means of manual steering controls, for example, by means of a steering wheel 61 and pedals (not shown in detail).

The vehicle 51 has sensors 57, in particular stereo cameras, by means of which the environment 52 is observed. The associated sensor data are transferred to a steering assistance system 60 which, on the basis thereof, determines a reference movement course and compares it with the movement course actually controlled by the driver in order to assign a steering quality level to the driver. For this purpose, the steering assistance system can also access the data from a sensor 62 belonging to the vehicle, here a driver camera that observes the driver. The sensor 62 provides indications of the alertness and fitness of the person 63, and can (as part of an image-recognizing identification device) also allow the person 63 or the current operator to be identified. The steering assistance system 60 also receives wireless data from a personal sensor 64 of the person 63, here a smart watch on the person's 63 wrist, which measures the person's 63 pulse rate. Furthermore, a further sensor 66, here a rear-view camera, is installed on the vehicle 51, by means of which a reaction of other (here following) road users to the movements of the vehicle 51 controlled by the person can be recorded (here more or less tailgating the vehicle 51). In the variant shown, the steering assistance system 60 also receives data from sensors 65 in the environment 52, here from a traffic observation camera 65 which is installed on a traffic light. In the latter case, data are also transmitted wirelessly.

Figure 15:
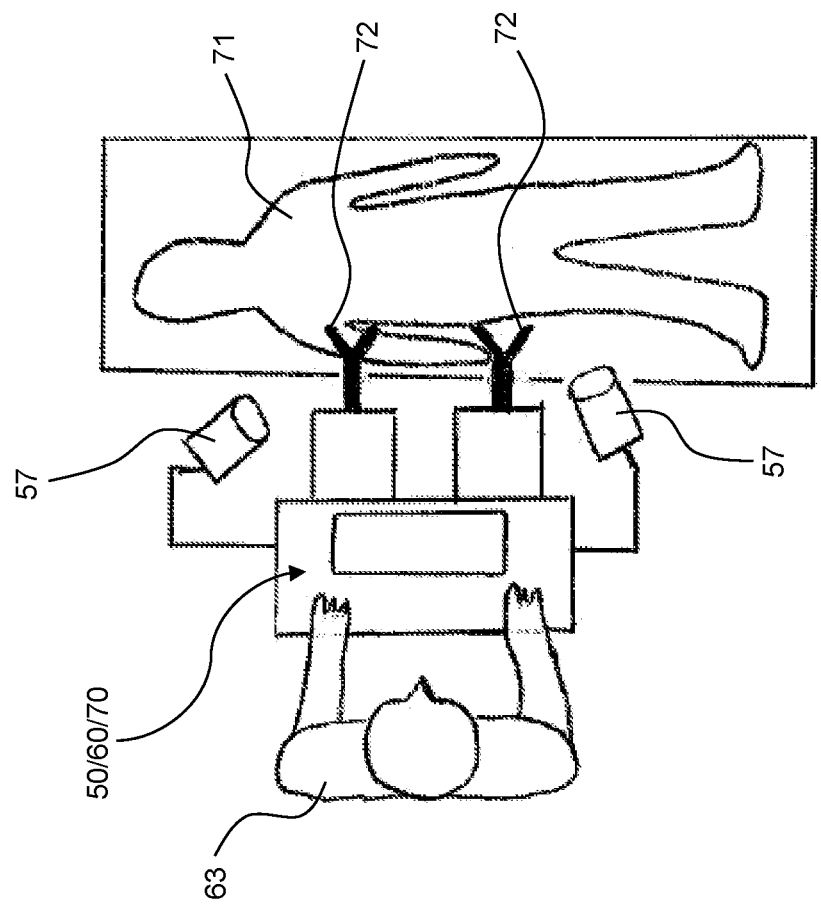
FIG. 15 illustrates, by way of example and schematically, a technical system for the invention designed as a surgical robot.

The technical system 50 can also be designed, for example, as a surgical robot 70, as shown in FIG. 15. An operation (surgical intervention) can be performed on a patient 71 using the operation robot 70. The surgical robot 70 here has two robot arms 72 which are at least temporarily and at least partially controlled manually by a person 63 (surgeon, doctor). The environment 52, here in particular the patient 71, is observed using sensors 57 of the technical system 50.

The technical system 50 comprises a steering assistance system 60 by means of which an appropriate reference movement course of the robot arms is determined during the operation for a future time interval, which is compared with the movement course actually controlled by the person in order to determine the steering quality level of the person 63.

Should the steering quality of the person (doctor, surgeon) decrease, this can easily be recognized within the scope of the invention, in particular if the decrease in skills occurs gradually, for example, due to aging. As a reaction to the assigned steering quality level, the surgeon can use perception aids (adapted glasses, hearing aid, or the like), for example, or he can be supported in certain situations by automatic control of the robot arms.

LIST OF REFERENCE SIGNS

1 Observation/planning (assistance system)
1a Observation/planning/control (assistance system)
2 Observation/planning/control (person)
3 Actual movement
4 Registration of actually controlled movement course
5 Comparison
6 Assignment of steering quality level 6a Assignment of steering quality level and authorization level
7 Selection of the source for control commands
8 Diagnosis of person's driving behavior
9 Determination of difference
10 Determination of confidence level
11 Issue warning notice
12 Takeover of control by the machine
13 Diagnosis of person's attention
14 Steering assistance system in silent mode/comparison
15 Observation of a person using a sensor of the technical system
16 Observation of a person using a personal sensor
17 Observation of environmental reaction
18 Technical system field
19 Environment field
20 Control field
21 Health field
22 Person's condition/steering quality level
50 Technical system
51 Vehicle
52 Environment
53 Road network
54 Reference movement course
55 Roadside
54a Further reference movement course
56 Actually controlled movement course
57 Sensors (technical system), in this case stereo cameras
60 Steering assistance system
61 Steering wheel
62 Sensor (technical system), in this case driver camera
63 Person
64 Sensor (personal, on person), in this case smart watch
65 Sensor (environment), in this case traffic observation camera
66 Sensor (technical system), in this case rear camera
70 Surgical robot
71 Patient
72 Robotic arm
90 Value
AI Averaging interval
ATV Absolute threshold value
A1 (first) Average value (average deviation parameter)
A2 (second) Average value (average deviation parameter)
A-Block, A-Low, A-Medium, A-Nightauto, A-Day, A-Tunnelauto, A-Full, A-Fullauto, A-Fullman: Authorization levels
BDP Base deviation parameter
CDP Current deviation parameter
CDP1-3 Current deviation parameter
K, −K Corridor limits
OP Observation period
P1 (first) Period of time
P2 (second) Period of time
S1-S6 Steering quality levels
S1A-S4A Steering quality levels
t Time
$t_{start}$ Start of time interval
$t_{end}$ End of time interval
UDP Update deviation parameter
y Observable

What is claimed is:

1. A method for operating a technical system in an environment, wherein the technical system can be moved, as a whole or in parts, in the environment by a motor, wherein a person controls movements of the technical system in the environment at least temporarily, wherein the technical system has a steering assistance system which comprises the following steps performed by the steering assistance system:
 a) observing the environment using sensors and, depending on the observed environment, determining reference movement courses for the technical system for future time intervals;
 b) registering movement courses of the technical system actually controlled by the person in the time intervals;
 c) carrying out a comparison between the reference movement courses and the movement courses actually controlled; and
 d) depending on the comparison result, assigning one of a plurality of steering quality levels to the person;
 wherein in step c) the steering assistance system determines at least one current deviation parameter from the comparison between the reference movement courses and the movement courses actually controlled, and wherein in step d) the steering quality level for the person is determined depending on the at least one current deviation parameter;
 wherein in step a), when determining the reference movement course, a confidence level of the reference movement course is also determined, and wherein, when determining the at least one current deviation parameter, a weighting of deviations of the actual movement course from the reference movement course is carried out depending on the confidence level, with deviations being weighted less at lower confidence levels than at higher confidence levels.

2. The method according to claim 1, wherein the technical system is a vehicle, and the environment comprises a transport network.

3. The method according to claim 2, wherein the vehicle is a road vehicle or an airplane or a drone or a train, and wherein the transport network is a road transport network or an aviation network or a rail network.

4. The method according to claim 1, wherein the technical system is a surgical robot, and the environment comprises a patient on whom an operation is performed.

5. The method according to claim 4, wherein the operation to be performed is a brain operation or a hip operation.

6. The method according to claim 1, wherein reference movement courses are evaluated with a lower confidence level, if they were determined at least partially on the basis of sensor data that are unreliable due to detected or suspected sensor errors or sensor degradations or due to environmental conditions that are unfavorable for the sensor function, than if the reference movement courses were determined on the basis of normally reliable sensor data.

7. The method according to claim 6, wherein in step d) the steering quality level is determined at least also depending on an absolute magnitude of the at least one current deviation parameter.

8. The method according to claim 6, wherein at least one average deviation parameter is determined for the person for the past, and wherein the steering quality level for the person is determined at least also depending on the deviation of the at least one current deviation parameter from the at least one average deviation parameter.

9. The method according to claim 6, wherein at least one current deviation parameter is averaged for a first period of time in the past, whereby at least one base deviation parameter is determined, the first period of time comprising at least 7 days, wherein this at least one current deviation parameter is averaged for a second period of time, whereby at least one update deviation parameter is determined, the second period of time comprising at least 7 days, wherein the first period of time is at least 60 days or at least 180 days before the second period of time, and wherein the steering quality level for the person is determined at least also depending on the deviation of the at least one update deviation parameter from the at least one base deviation parameter.

10. The method according to claim 6, wherein for the person the time course of the at least one current deviation parameter is observed over an observation period of at least 60 days or at least 180 days, wherein in the observation period a moving average of the at least one current deviation parameter is formed, the moving average being determined by averaging the at least one current deviation parameter in an averaging interval of at least 7 days or at least 14 days, and wherein the steering quality level for the person is determined at least also depending on the change in the moving average.

11. The method according to claim 1, wherein the technical system is controlled by a plurality of operators alternately, wherein the steering assistance system has an identification device by means of which a current operator can be automatically identified, and wherein individual steering quality levels are determined for the respective operators.

12. The method according to claim 1, wherein the steering assistance system, together with the steering quality level, also specifies one of a plurality of authorization levels, a respective authorization level limiting the movements of the technical system in the environment which the person can control on the technical system.

13. The method according to claim 12, wherein at least one of the authorization levels limits a maximum speed of the technical system or a part thereof that can be controlled by the person, and/or wherein at least one of the authorization levels enforces a minimum distance for a distance of the technical system or a part thereof from structures in the environment, which can be controlled by the person, and/or wherein at least one of the authorization levels limits the environment in which movements of the technical system can be controlled by the person, and/or wherein at least one of the authorization levels limits the time of day at which movements of the technical system can be controlled by the person.

14. The method according to claim 12, wherein at least one of the authorization levels comprises a complete blocking of the further control of movements of the technical system by the person.

15. The method according to claim 1, wherein the steering assistance system is designed as an automatic steering system by means of which movements of the technical system in the environment can be controlled automatically at least temporarily.

16. The method according to claim 15, wherein the automatic steering system is operated in a "silent mode" in step a) to determine the reference movement courses for the technical system.

17. The method according to claim 12, wherein the steering assistance system is designed as an automatic steering system by means of which movements of the technical system in the environment can be controlled automatically at least temporarily, and wherein the automatic steering system takes over the control of the movements of the technical system partially or completely in at least one of the authorization levels.

18. The method according to claim 17, wherein the degree to which the automatic steering system takes over the control of the movements of the technical system depends on the environment in at least one of the authorization levels.

19. The method according to claim 1, wherein the assignment of the steering quality level also includes information from one or more sensors that are arranged in the environment and observe the technical system from the outside and/or the environment of the technical system.

20. The method according to claim 1, wherein the assignment of the steering quality level also includes information from one or more sensors of the technical system and/or the environment, which determine a reaction of the environment to the actual course of movement of the technical system.

21. The method according to claim 1, wherein in step a) a plurality of reference movement courses are determined at least in individual situations, wherein in step c) there is a comparison of the actually controlled movement course with each of the reference movement courses for the associated situation, and wherein only one of the comparisons is taken into account for determining the steering quality level in step d).

22. The method according to claim 21, wherein in step d) only that comparison is taken into account in which the actual movement course exhibits the smallest deviations from the reference movement course.

23. The method according to claim 1, wherein the assignment of the steering quality level also includes information from one or more sensors that observe the person when the movements of the technical system are controlled.

24. The method according to claim 1, wherein the assignment of the steering quality level to the person also includes information that was previously obtained with at least one further technical system from comparing reference movement courses and actually controlled movement courses of said person on said at least one further technical system.

* * * * *

UNITED STATES PATENT AND TRADEMARK OFFICE
CERTIFICATE OF CORRECTION

PATENT NO. : 11,906,953 B2
APPLICATION NO. : 17/444700
DATED : February 20, 2024
INVENTOR(S) : Sven Fleck and Benjamin May It is certified that error appears in the above-identified patent and that said Letters Patent is hereby corrected as shown below:

In the Claims

Column 22, Claim 7, Line 50, "6" should read --1--.

Column 22, Claim 8, Line 54, "6" should read --1--.

Column 22, Claim 9, Line 60, "6" should read --1--.

Column 23, Claim 10, Line 6, "6" should read --1--.

Signed and Sealed this
Eighteenth Day of June, 2024

Katherine Kelly Vidal
*Director of the United States Patent and Trademark Office*